United States Patent
Cho et al.

(10) Patent No.: US 11,329,310 B2
(45) Date of Patent: May 10, 2022

(54) SECONDARY BATTERY HAVING IMPROVED CURRENT-COLLECTING STRUCTURE

(71) Applicant: Samsung SDI Co., Ltd., Yongin-si (KR)

(72) Inventors: Chang Hun Cho, Yongin-si (KR); Sung Han Kim, Yongin-si (KR); Joong Hun Kim, Yongin-si (KR); Wook Su Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/094,000

(22) Filed: Nov. 10, 2020

(65) Prior Publication Data

US 2021/0257649 A1    Aug. 19, 2021

(30) Foreign Application Priority Data

Feb. 13, 2020  (KR) .......................... 10-2020-0017968

(51) Int. Cl.
*H01M 10/04* (2006.01)
*H01M 50/538* (2021.01)
(Continued)

(52) U.S. Cl.
CPC ........... *H01M 10/045* (2013.01); *H01M 4/70* (2013.01); *H01M 50/46* (2021.01); *H01M 50/538* (2021.01)

(58) Field of Classification Search
CPC .. H01M 50/50; H01M 50/528; H01M 50/536; H01M 50/538; H01M 10/045;
(Continued)

(56) References Cited

U.S. PATENT DOCUMENTS 9,219,267 B2   12/2015  Woo
2010/0178559 A1*   7/2010  Mao .................... H01M 4/667
                                                                429/211
(Continued)

FOREIGN PATENT DOCUMENTS

EP       3 694 043 A1    8/2020
JP     2013065568 A  *  4/2013  .......... H01M 10/052
(Continued)

OTHER PUBLICATIONS

Machine translation of JP-2013065568-A (Year: 2013).*
(Continued)

*Primary Examiner* — William E Mcclain
*Assistant Examiner* — Jason Barton
(74) *Attorney, Agent, or Firm* — Lewis Roca Rothgerber Christie LLP

(57) ABSTRACT

A secondary battery having an improved current-collecting structure is provided. In an example embodiment, the secondary battery includes an electrode assembly including a plurality of unit electrode plates each including a pair of non-coating portion tabs at a first side and a plurality of separators each located between the unit electrode plates; and a current collector plate welded to the non-coating portion tabs, and the current collector plate is welded in a state in which the pair of non-coating portion tabs are bent in opposite directions. The pair of non-coating portion tabs are bent in opposite directions to then be welded to the current collector plate, and welding may be complementarily performed, thereby securing electrical stability.

14 Claims, 6 Drawing Sheets

(51) Int. Cl.
 *H01M 50/46* (2021.01)
 *H01M 4/70* (2006.01)
(58) Field of Classification Search
 CPC .......... H01M 10/0431; H01M 50/531; H01M 50/533; H01M 50/54; H01M 50/541; H01M 50/46; H01M 4/70; Y02E 60/10; Y02P 70/50
 See application file for complete search history.

(56) References Cited

U.S. PATENT DOCUMENTS

| | | |
|---|---|---|
| 2013/0252053 A1 | 9/2013 | Woo |
| 2019/0013506 A1 | 1/2019 | Park |
| 2019/0393474 A1 | 12/2019 | Lee et al. |
| 2020/0251787 A1 | 8/2020 | Shinoda et al. |
| 2020/0343520 A1 | 10/2020 | Jeong et al. |

FOREIGN PATENT DOCUMENTS

| | | | | |
|---|---|---|---|---|
| KR | 10-1328991 B1 | 11/2013 | | |
| KR | 10-1750086 B1 | 6/2017 | | |
| KR | 10-2018-0061681 A | 6/2018 | | |
| KR | 10-2019-0084751 A | 7/2019 | | |
| WO | WO-2012023804 A2 | * 2/2012 | ........ | H01M 10/0413 |
| WO | WO 2019/088053 A1 | 5/2019 | | |
| WO | WO-2019088053 A1 | * 5/2019 | .......... | H01M 50/536 |
| WO | WO 2020/015362 A1 | 1/2020 | | |

OTHER PUBLICATIONS

Machine translation of WO-2012023804-A2 (Year: 2012).*
European Search Report for corresponding European Application No. 21153281.7, European Search Report dated Jul. 5, 2021 (9 pgs.).

* cited by examiner

RELATED ART

RELATED ART

SECONDARY BATTERY HAVING IMPROVED CURRENT-COLLECTING STRUCTURE

CROSS-REFERENCE TO RELATED APPLICATION

This application claims priority to and the benefit of Korean Patent Application No. 10-2020-0017968, filed on Feb. 13, 2020 in the Korean Intellectual Property Office, the entire content of which is herein incorporated by reference.

BACKGROUND

1. Field

Aspects of embodiments of the present disclosure relate to a secondary battery.

2. Description of the Related Art

In general, secondary batteries can be charged and discharged, unlike primary batteries which are not rechargeable. The secondary battery may be used in the form of a single battery or a battery module having a plurality of batteries connected in a unit, such as depending on the kind of device employing the secondary battery.

Secondary batteries may be used as an energy source for driving in portable small-sized electronic devices, such as mobile phones or laptop computers, and may also be used in driving motors for large-sized transportation means, such as hybrid cars, or the like, and, thus, there is significantly increasing demand for secondary batteries having high output power and high capacity.

In order to supply sufficient power to an electronic device or a transportation means, secondary batteries need to be designed so as to have a stable structure.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present disclosure, a secondary battery having an improved current-collecting structure is provided.

According to one or more embodiments of the present disclosure, a secondary battery includes: an electrode assembly including a plurality of unit electrode plates including a pair of non-coating portion tabs at a first side and a plurality of separators each located between the unit electrode plates; and a current collector plate welded to the non-coating portion tabs, wherein the current collector plate is welded in a state in which the pair of non-coating portion tabs are bent in opposite directions.

The current collector plate may be laser welded to the non-coating portion tabs.

After the welding of the current collector plate is completed, ends of the non-coating portion tabs protruding outward in a lengthwise direction of the current collector plate may be taped in a state in which they are folded toward welding portions of the current collector plate.

The non-coating portion tabs may include a first tab and a second tab, and when the current collector plate and the non-coating portion tabs are welded, at least one of the first tab and the second tab may be in a welded state with respect to the current collector plate.

According to one or more embodiments of the present disclosure, a secondary battery includes: an electrode assembly including a plurality of first electrode plates including a pair of non-coating portion tabs at a first side, a plurality of second electrode plates having a pair of non-coating portion tabs, and a separator positioned between each of the first electrode plates and each of the second electrode plates, and the electrode assembly being wound or stacked; and a current collector plate welded to the non-coating portion tabs, wherein the current collector plate is welded in a state in which the pair of non-coating portion tabs are compressed in opposite directions.

The current collector plate may be laser welded to the non-coating portion tabs.

After the welding of the current collector plate is completed, ends of the non-coating portion tabs protruding outward in a lengthwise direction of the current collector plate may be taped in a state in which they are folded toward welding portions of the current collector plate.

The non-coating portion tabs may include a first tab and a second tab, and when the current collector plate and the non-coating portion tabs are welded, at least one of the first tab and the second tab may be in a welded state with respect to the current collector plate.

As described above, according to an aspect of one or more embodiments of the present disclosure, since non-coating portion tabs are shortened in length, scrap portions are reduced, leading to a reduction in the loss of raw materials, thereby attaining a cost-saving effect.

According to an aspect of one or more embodiments of the present disclosure, since a pair of non-coating portion tabs are bent in different directions to then be welded to a current collector plate, welding may be complementarily performed, thereby securing electrical stability.

In addition, according to an aspect of one or more embodiments of the present disclosure, since a pair of non-coating portion tabs are bent in different directions to then be welded to a current collector plate, stable welding may be performed even when the non-coating portion tabs are shortened in length, as compared with conventional non-coating portion tabs, thereby securing welding reliability and electrical stability.

DESCRIPTION OF REFERENCE NUMERALS

Figure 1:
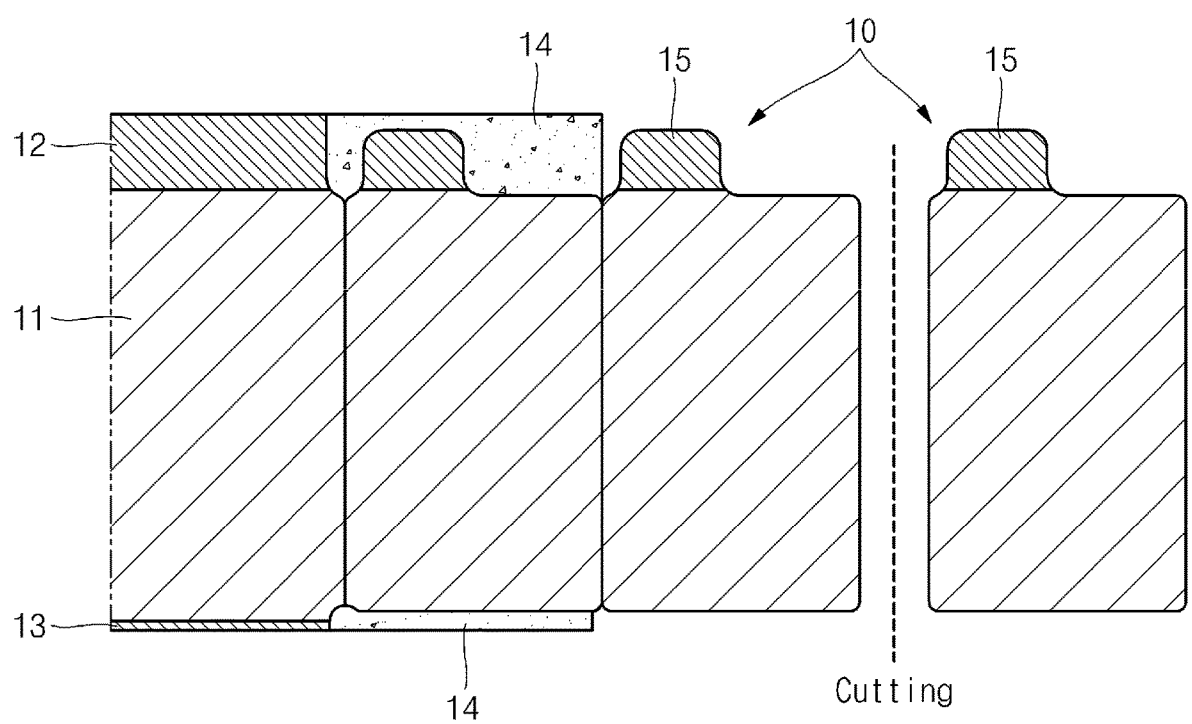
FIG. 1 is a plan view showing a process of forming a non-coating portion in a general electrode plate.

| | |
|---|---|
| 100: Electrode plate | 110: Coating portion |
| 120: Non-coating portion | 130: Scrap portion |
| 140: Non-coating portion tab | 142: First tab |
| 144: Second tab | 300: Current collector plate |

DETAILED DESCRIPTION

Herein, some example embodiments of the present disclosure will be described in further detail. The subject matter of the present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, for example, the term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a secondary battery having an improved current-collecting structure according to embodiments of the present disclosure will be described in further detail with reference to the accompanying drawings.

First, a general configuration of a secondary battery will be briefly described.

The secondary battery may be configured such that an electrode assembly and an electrolyte are accommodated within a case, such as a can or a pouch, and then sealed. The electrode assembly may be electrically connected to a current collector through welding, and may be electrically connected to an external terminal through the current collector.

The electrode assembly may include a first electrode plate, a second electrode plate, and a separator positioned therebetween, and may be wound in a roll type or stacked in a multi-layer stack type. The first electrode plate may serve as a positive electrode, and the second electrode plate may serve as a negative electrode.

The first electrode plate may include a coating portion with a positive electrode active material coated thereon, and a non-coating portion without an active material coated thereon. A portion of the non-coating portion may be cut to form an electrode tab of the first electrode plate.

The second electrode plate may include a coating portion with a negative electrode active material coated thereon, and a non-coating portion without an active material coated thereon. A portion of the non-coating portion may be cut to form an electrode tab of the second electrode plate.

The first electrode plate and the second electrode plate may be formed in the following process.

FIG. 1 is a plan view showing a process of forming a non-coating portion in a general electrode plate. The following description will be made with regard to a stack type electrode assembly by way of example, but the description may also be applied to a jelly-roll type electrode assembly. The electrode plate is interpreted as a concept that encompasses both a positive electrode plate and a negative electrode plate.

As shown in FIG. 1, an electrode plate 10 may include a coating portion 11 formed by coating a positive electrode active material or a negative electrode active material on a metal base, and an upper non-coating portion 12 and a lower non-coating portion 13, on which an active material is not coated. The upper non-coating portion 12 and the lower non-coating portion 13 may be cut by a method such as pressing and processed into a desired shape. Here, a portion removed by cutting is defined as a scrap portion 14.

A non-coating portion tab 15 may be formed by cutting all of the lower non-coating portion 13 and partially cutting the upper non-coating portion 12 while leaving some of the upper non-coating portion 12. The non-coating portion tab 15 becomes an electrode tab of the first electrode plate or the second electrode plate.

Figure 2:
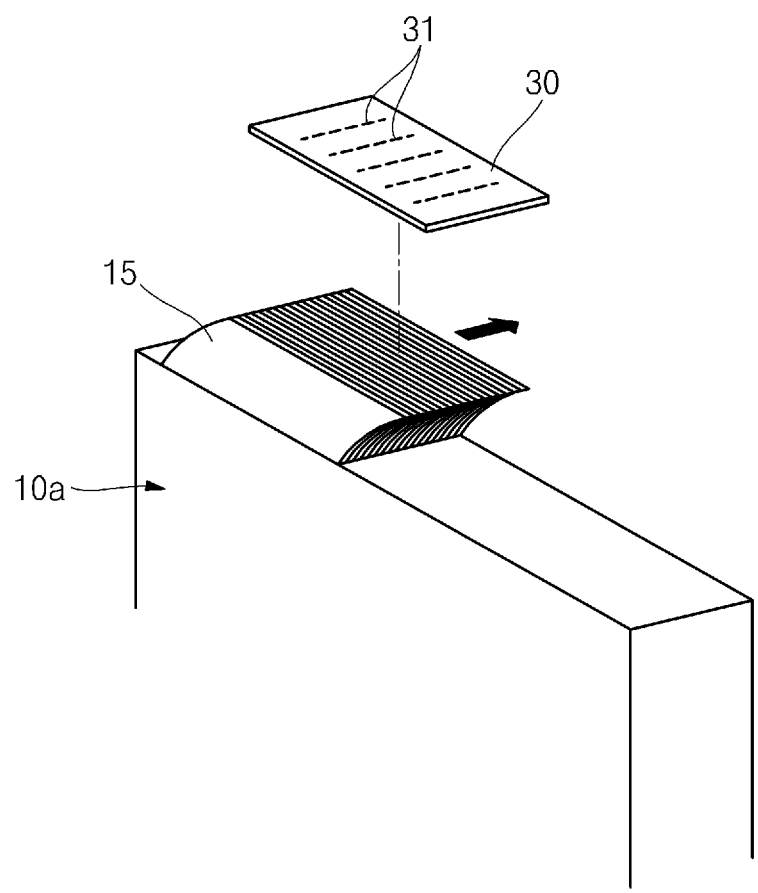
FIG. 2 is a perspective view schematically showing an example welding type of non-coating portion tabs in an electrode assembly of FIG. 1.

After the processing of the non-coating portion tab 15 is completed, cutting is performed one by one into a type of unit electrode plates (units each consisting of a non-coating portion and a coating portion), and a separator is inserted between each of the unit electrode plates to then be stacked, thereby forming an electrode assembly 10a (see FIG. 2).

FIG. 2 is a perspective view schematically showing an example welding type of non-coating portion tabs in an electrode assembly of FIG. 1.

As shown in FIG. 2, once the electrode assembly 10a is formed, a plurality of non-coating portion tabs 15 protrude from a side of the electrode assembly 10a and are aligned. A current collector plate 30 may be welded to the non-coating portion tabs 15 to electrically connect the non-coating portion tabs 15 and the current collector plate 30. In an embodiment, for welding of the non-coating portion tabs 15, the non-coating portion tabs 15 are collectively bent to one side (in the direction indicated by the arrow of FIG. 2), and the current collector plate 30 is then brought into close contact with a bending plane, followed by ultrasonic welding. Only positions of welding portions 31 are roughly indicated in FIG. 2.

As the thickness of the electrode assembly 10a is increased, the number of non-coating portion tabs 15 is increased accordingly. Thus, in order to bend the non-coating portion tabs 15 to perform welding thereon, lengths of the non-coating portion tabs 15 should be increased. Therefore, the amount of scrap portions thrown away from raw materials may be increased, resulting in an increased loss of the raw materials. In addition, as the number of sheets of the bent and stacked non-coating portion tabs 15 is increased, welding quality variations may increase during ultrasonic welding, and a loss of lateral surface spaces may be created, thereby lowering the capacity of the secondary battery.

Therefore, there is a need for a secondary battery which can reduce a loss of raw materials by improving an electrode assembly structure and a welding structure, and can maintain welding quality even if the number of sheets of stacked non-coating portion tabs is increased. A secondary battery having an improved current-collecting structure according to an embodiment of the present disclosure, as compared to the structures shown in FIGS. 1 and 2, will now be described.

Figure 3:
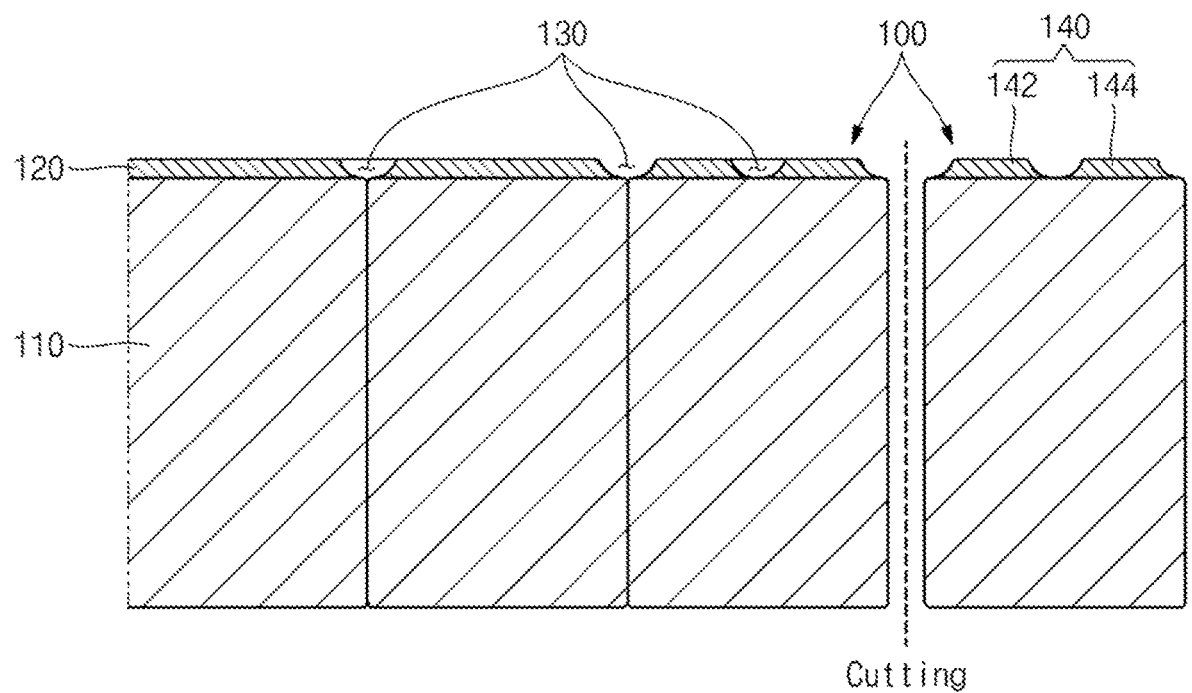
FIG. 3 is a plan view showing a process of forming a non-coating portion in an electrode plate according to an embodiment of the present disclosure.
Figure 4:
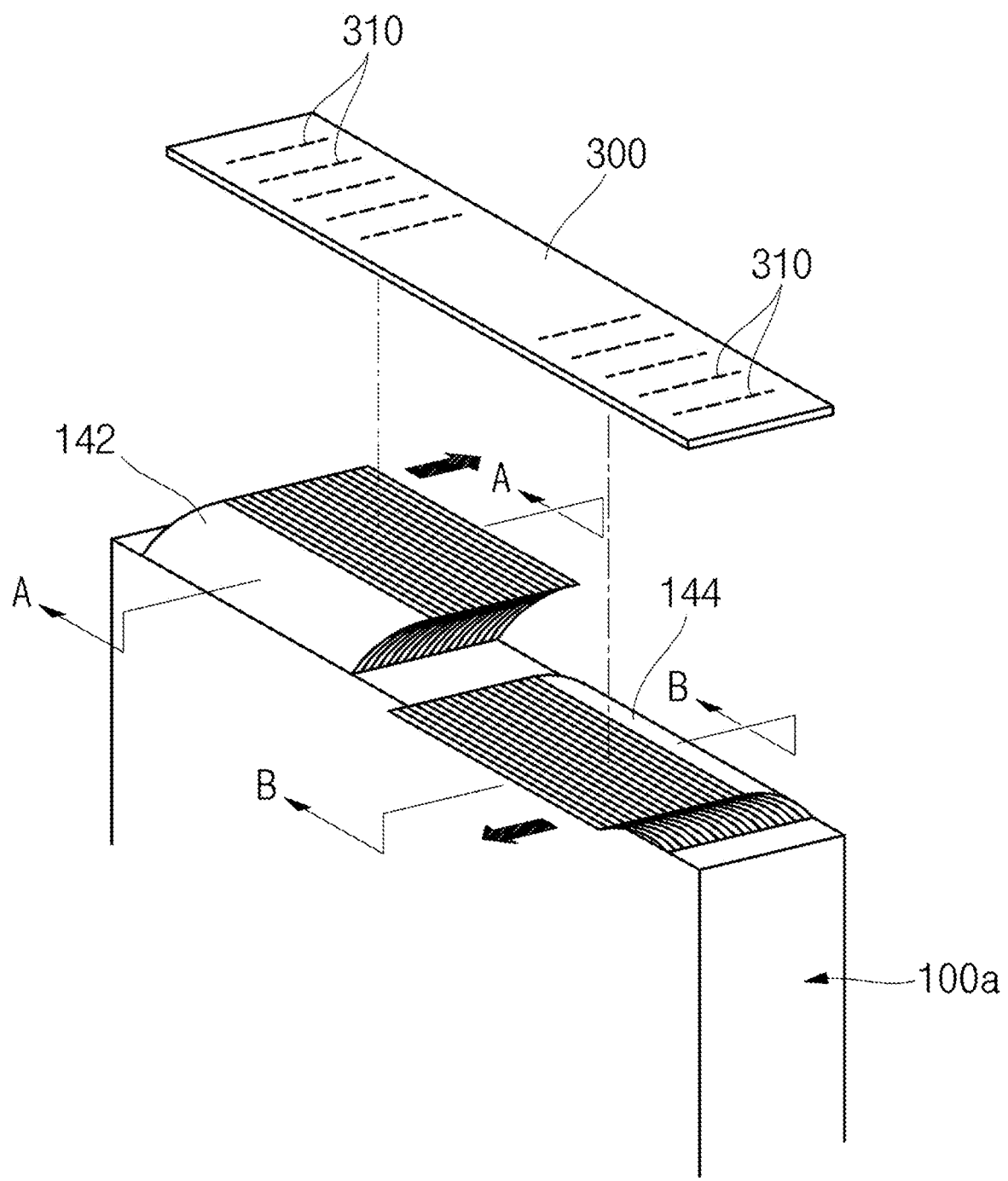
FIG. 4 is a perspective view schematically showing a bent state of non-coating portion tabs in an electrode assembly of FIG. 3.
Figure 5:
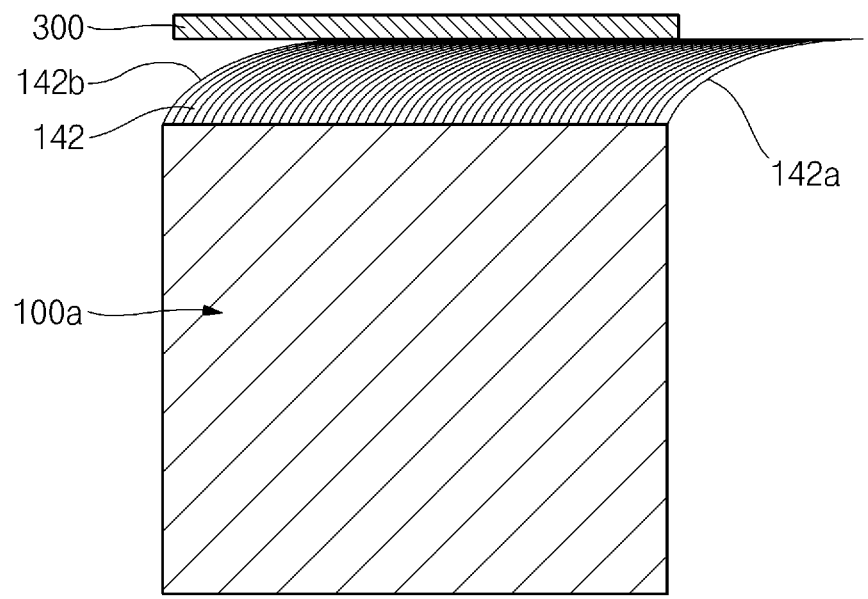
FIG. 5 is a cross-sectional view schematically showing the electrode assembly taken along the line A-A of FIG. 4.
Figure 6:
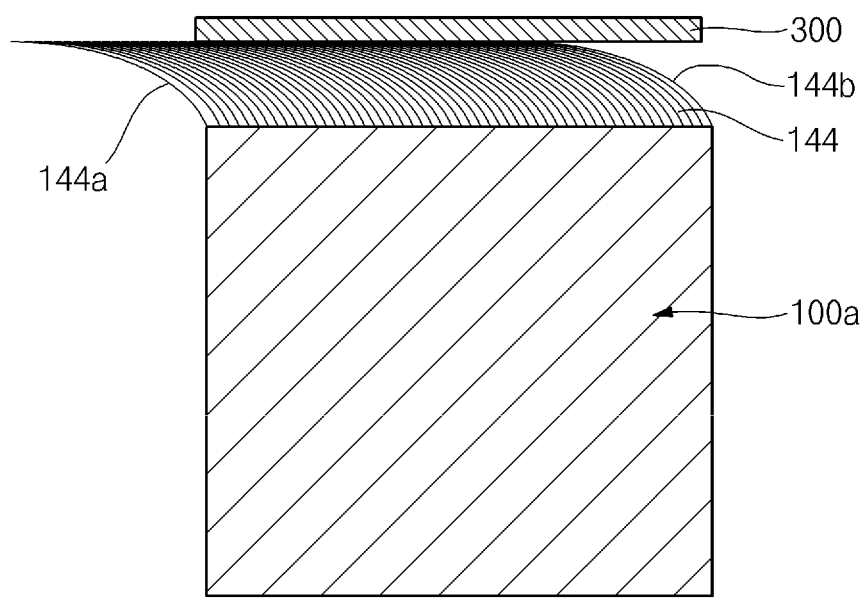
FIG. 6 is a cross-sectional view schematically showing the electrode assembly taken along the line B-B of FIG. 4.

FIG. 3 is a plan view showing a process of forming a non-coating portion in an electrode plate according to an embodiment of the present disclosure; FIG. 4 is a perspective view schematically showing a bent state of non-coating portion tabs in the electrode assembly shown in FIG. 3; FIG. 5 is a cross-sectional view schematically showing the electrode assembly taken along the line A-A of FIG. 4; and FIG. 6 is a cross-sectional view schematically showing the electrode assembly taken along the line B-B of FIG. 4. In FIGS. 5 and 6, for ease of description, only the non-coating portion tab is shown in plural forms, exclusive of the electrode plate.

As shown in FIG. 3, an electrode plate 100 according to an embodiment of the present disclosure may include a coating portion 110 formed by coating a positive electrode active material or a negative electrode active material on a metal base, and a non-coating portion 120 without an active material coated thereon. Here, the non-coating portion 120 may consist of an upper non-coating portion and a lower non-coating portion. In the present embodiment, the lower non-coating portion has quite a small width, and thus it is not shown, for the sake of brevity. The non-coating portion 120 may be cut by a method such as pressing and processed into a required shape. Here, a portion removed by cutting is defined as a scrap portion 130.

A pair of non-coating portion tabs 140 may be formed by cutting the non-coating portion 120 while leaving some of the non-coating portion 120 disposed at the upper side, as shown in FIG. 3. The non-coating portion tabs 140 become electrode tabs of the first electrode plate or the second electrode plate. Since the non-coating portion tabs 140 are formed in a pair, the pair of the non-coating portion tabs 140 defined as a first tab 142 and a second tab 144 are shown for brevity and clarity.

The first tab 142 and the second tab 144 are arranged to be spaced by a distance (e.g., a predetermined distance) apart from each other. Compared to the non-coating portion tabs 15 shown in FIG. 1, the non-coating portion tabs 140 have reduced lengths extending from the coating portion 110, which will later be described.

After the processing of the non-coating portion tabs 140 is completed, cutting is done one by one into a type of unit electrode plates (units each consisting of a non-coating portion and a coating portion), and a separator is inserted between the unit electrode plates to then be stacked, thereby forming an electrode assembly 10a. For brevity and clarity, the unit electrode plates will be described using the same reference numerals as those used in the electrode plate 100 having yet to be cut.

As shown in FIG. 4, once the electrode assembly 100a is formed, a plurality of first tabs 142 and a plurality of second tabs 144 protrude from a side of the electrode assembly 100a and are aligned. A current collector plate 300 may be welded to the non-coating portion tabs 140 to electrically connect the non-coating portion tabs 140 and the current collector plate 300. In an embodiment, for welding of the non-coating portion tabs 140, the first tabs 142 are collectively bent to one side (in the direction indicated by the right-pointing arrow of FIG. 4), the second tabs 144 are collectively bent to the other side (in the direction indicated by the left-pointing arrow of FIG. 4), and the current collector plate 300 is then brought into close contact with a bending plane, followed by ultrasonic welding. Only positions of welding portions 310 are roughly indicated in FIG. 4.

In an example embodiment, the first tabs 142 may lie down to the right, and the second tabs 144 may lie down to the left, as shown in FIG. 4. That is, the pair of non-coating portion tabs 140 provided in one electrode plate 100 are bent in opposite directions. Although the first tabs 142 and the second tabs 144 not completely lying down are shown, they may completely lie down in the bending direction while being welded.

In such a state, as shown in FIGS. 5 and 6, the current collector plate 300 is lifted for welding. In an actual welding process, the first tabs 142 and the second tabs 144 are compressed further than is shown in FIGS. 5 and 6, thereby allowing the current collector plate 300 to be located adjacent to the electrode assembly 100a.

As shown in FIG. 5, from a viewpoint of the first tabs 142, a rightmost one 142a, among the plurality of first tabs 142, may not be welded to the current collector plate 300 during welding. Conversely, a leftmost one 142b, among the plurality of first tabs 142 shown in FIG. 5, may be welded to the current collector plate 300 in a state in which most regions thereof are in contact with the current collector plate 300 during welding.

Meanwhile, as shown in FIG. 6, from a viewpoint of the second tabs 144, a rightmost one 144b, among the plurality of second tabs 144, may be welded to the current collector plate 300 in a state in which most regions thereof are in contact with the current collector plate 300 during welding. Conversely, a leftmost one 144*a*, among the plurality of second tabs 144 shown in FIG. 6 may not be welded to the current collector plate 300.

Based on the same principle, one or more of the first tabs 142 and the second tabs 144 may not be welded to the current collector plate 300.

In an embodiment, one pair of non-coating portion tabs 140 is formed on one unit electrode plate 100. Therefore, the rightmost tab 142*a* among the first tabs 142 shown in FIG. 5 corresponds to the non-coating portion tab 140 formed on the same electrode plate 100 as the rightmost tab 144*b* among the second tabs 144 shown in FIG. 6. Likewise, the leftmost tab 142*b* among the first tabs 142 shown in FIG. 5 corresponds to the non-coating portion tab 140 formed on the same electrode plate 100 as the leftmost tab 144*a* among the second tabs 144 shown in FIG. 6. Therefore, the electrode assembly 100*a* of the present disclosure may have a welding structure in which, although one of the pair of non-coating portion tabs 140 may not be welded to the current collector plate 300, the other of the pair of non-coating portion tabs 140 is welded to the current collector plate 300. That is, the pair of non-coating portion tabs 140 may be complementarily welded.

According to the present disclosure, since at least one of the pair of non-coating portion tabs 140 is welded to the current collector plate 300, constant welding quality can be maintained during welding, thereby reducing a loss of lateral surface spaces and preventing or substantially preventing the battery capacity from being decreased.

While the aforementioned embodiment has been described by way of example with regard to a case in which the non-coating portion is provided only at an upper side of the electrode plate 100, the non-coating portion may be provided at both of the upper side and the lower side of the electrode plate 100. In this case, a single non-coating portion, instead of a pair of non-coating portions, may be provided at the upper side, and a single non-coating portion may also be provided at the lower side.

Based on the same principle as in the aforementioned embodiment, the upper non-coating portion and the lower non-coating portion may be bent in opposite directions to then be welded to the current collector plate, respectively.

Figure 7:
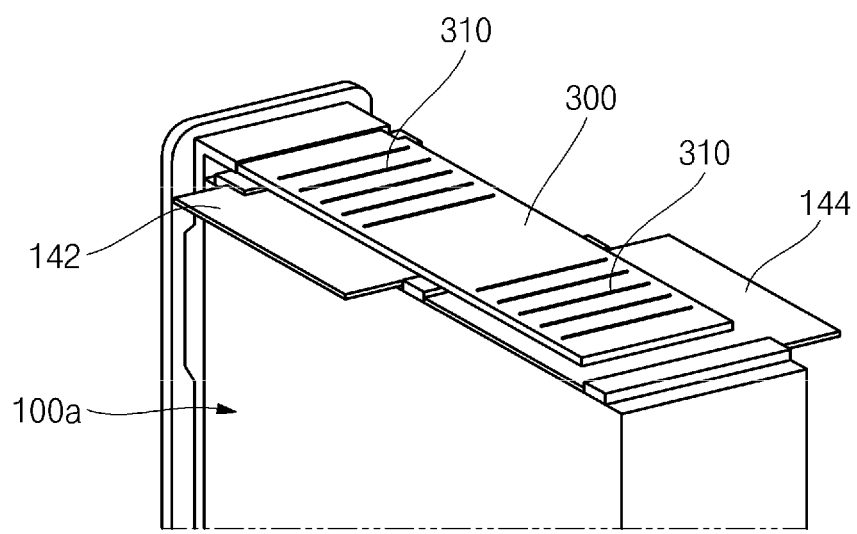
FIG. 7 is a perspective view schematically showing an example welding type of non-coating portion tabs in the electrode assembly shown in FIG. 4.

FIG. 7 is a perspective view schematically showing an example welding type of non-coating portion tabs in the electrode assembly shown in FIG. 4.

As shown in FIG. 7, after a pair of non-coating portion tabs 140 are bent in opposite directions and then pressed, the current collector plate 300 is lifted and welding portions 310 thereof are welded through laser welding, thereby electrically connecting the non-coating portion tabs 140 and the current collector plate 300.

Although FIG. 7 shows by way of example that the non-coating portion tabs 140 are completely folded, the non-coating portion tabs 140 may be compressed in a streamlined manner, rather than being completely folded, according to the number and thickness of the non-coating portion tabs 140.

Figure 8:
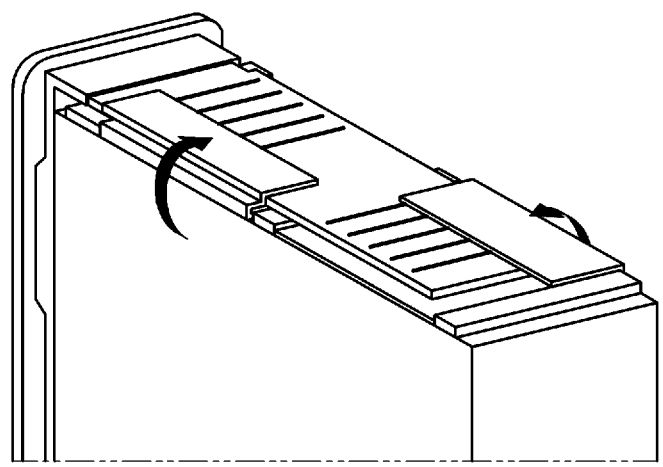
FIG. 8 is a perspective view showing an example taping state after welding the non-coating portion tabs shown in FIG. 7.

FIG. 8 is a perspective view showing an example taping state after welding the non-coating portion tabs shown in FIG. 7.

When the laser welding is completed, remaining portions of the first and second tabs 142 and 144 protruding outward in a lengthwise direction of the current collector plate 300 may be folded over the current collector plate 300, as shown in FIG. 8. In such a state, a tape may be attached onto the current collector plate 300, thereby fixing the folded portions.

If the remaining portions of the first tab 142 and the second tab 144 are folded toward the current collector plate 300 and taped while being in close contact with the current collector plate 300, even portions that are not welded to the current collector plate 300 may be brought into contact with the current collector plate 300 to then be electrically connected. Therefore, electrical connections of unwelded portions can be compensated for.

Since the electrode assembly 100*a* of the present disclosure has the aforementioned current collecting structure, welding can be performed even if the non-coating portion tabs 140 are shorter than those shown in FIGS. 1 and 2. In addition, since at least one of the pair of non-coating portion tabs 140 is welded to the current collector plate 300, welding quality can be maintained even if the number of non-coating portion tabs 140 is increased.

Therefore, a battery cell having an increased thickness can be designed, thereby increasing the design capacity and enhancing a degree of design freedom.

In addition, during the operation of a secondary battery, heat generation tends to concentrate on the non-coating portion tabs 140. According to one or more embodiments, the heat generation may be suppressed by about 19° C. to 35° C. under the same current operating condition by reducing the lengths of the non-coating portion tabs 140, compared to that shown in FIGS. 1 and 2.

In an embodiment, when the current collector plate 300 is welded, the welding portions 310 are welded to the non-coating portion tabs 140 through laser welding, instead of ultrasonic welding. The ultrasonic welding may make it difficult to secure appropriate welding quality due to the number of non-coating portion tabs 140 bent and folded. Accordingly, the welding quality of the welding portions 310 can be secured through laser welding.

While the foregoing example embodiments have been described to practice the secondary battery of the present disclosure, it will be understood by those of ordinary skill in the art that various changes in form and detail may be made therein without departing from the spirit and scope of the present disclosure as set forth by the following claims.

What is claimed is:

1. A secondary battery comprising:
    an electrode assembly comprising a plurality of unit electrode plates each comprising a pair of non-coating portion tabs protruding from a first side, and a plurality of separators each located between unit electrode plates of the plurality of unit electrode plates; and
    a current collector plate welded to the pair of non-coating portion tabs of each of the plurality of unit electrode plates,
    wherein the pair of non-coating portion tabs of each of the plurality of unit electrode plates comprises a first tab and a second tab, and
    wherein the current collector plate is welded in a state in which the first tab and the second tab of each of the plurality of unit electrode plates are bent toward the first side in opposite directions.

2. The secondary battery of claim 1, wherein the current collector plate is laser welded to the pair of non-coating portion tabs of each of the plurality of unit electrode plates.

3. The secondary battery of claim 1, wherein ends of the non-coating portion tabs of the plurality of unit electrode plates are taped in a state in which they are folded toward welding portions of the current collector plate.

4. The secondary battery of claim 1, wherein at least one of the first tab and the second tab of each of the plurality of unit electrode plates is in a welded state with the current collector plate.

5. The secondary battery of claim 1, wherein the current collector plate is in direct contact with the pair of non-coating portion tabs of each of the plurality of unit electrode plates.

6. The secondary battery of claim 1, wherein a same first surface of the current collector plate is welded to the pair of non-coating portion tabs of each of the plurality of unit electrode plates.

7. The secondary battery of claim 6, wherein the first surface of the current collector plate is perpendicular to a stacking direction of the plurality of unit electrode plates.

8. A secondary battery comprising:
an electrode assembly comprising a plurality of first electrode plates each comprising a pair of non-coating portion tabs protruding from a first side, a plurality of second electrode plates each comprising a pair of non-coating portion tabs, and a plurality of separators each located between a first electrode plate of the plurality of first electrode plates and a second electrode plate of the plurality of second electrode plates, the electrode assembly being wound or stacked; and
a current collector plate welded to the pair of non-coating portion tabs of each of the plurality of first electrode plates,
wherein the pair of non-coating portion tabs of each of the plurality of first electrode plates comprises a first tab and a second tab, and
wherein the current collector plate is welded in a state in which the first tab and the second tab of each of the plurality of first electrode plates are compressed toward the first side in opposite directions.

9. The secondary battery of claim 8, wherein the current collector plate is laser welded to the pair of non-coating portion tabs of each of the plurality of first electrode plates.

10. The secondary battery of claim 8, wherein ends of the non-coating portion tabs of the plurality of first electrode plates are taped in a state in which they are folded toward welding portions of the current collector plate.

11. The secondary battery of claim 8, wherein at least one of the first tab and the second tab of each of the plurality of first electrode plates is in a welded state with the current collector plate.

12. The secondary battery of claim 8, wherein the current collector plate is in direct contact with the pair of non-coating portion tabs of each of the plurality of first electrode plates.

13. The secondary battery of claim 8, wherein a same first surface of the current collector plate is welded to the pair of non-coating portion tabs of each of the plurality of first electrode plates.

14. The secondary battery of claim 13, wherein the first surface of the current collector plate is perpendicular to a stacking direction of the plurality of first electrode plates.

* * * * *